Dec. 22, 1959   D. M. SIMPSON   2,917,958
TOOL HOLDER
Filed Nov. 5, 1956
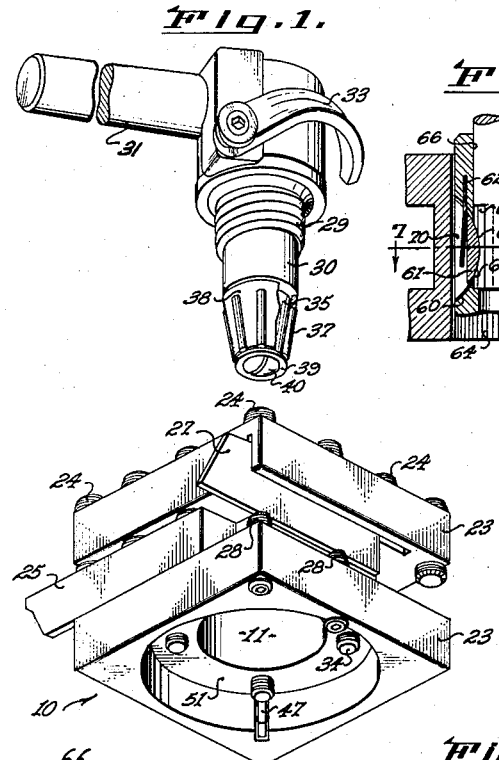
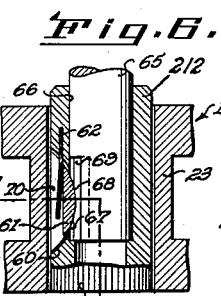
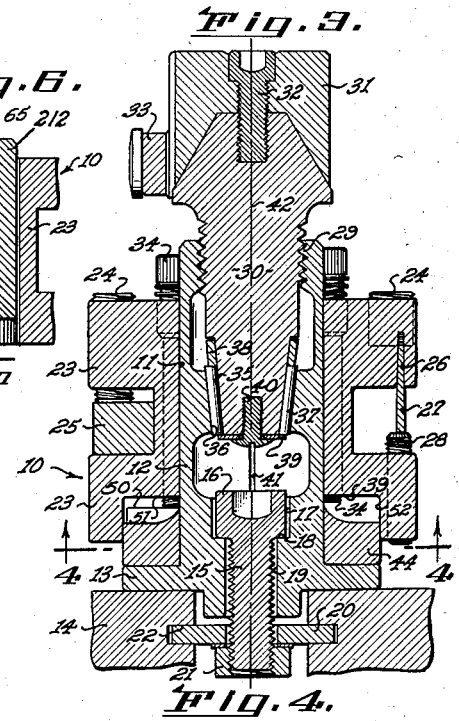
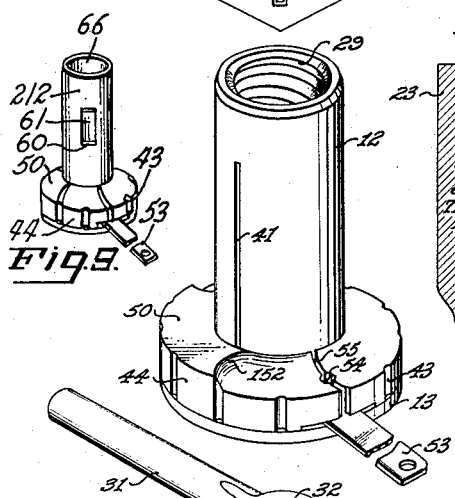
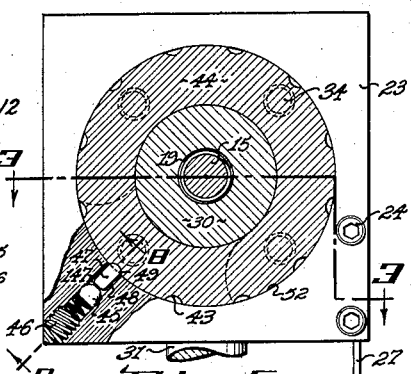
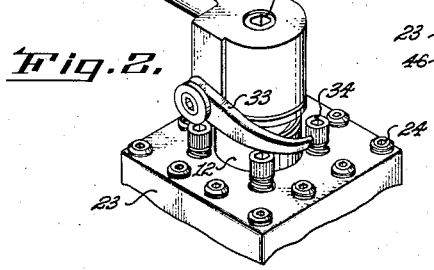
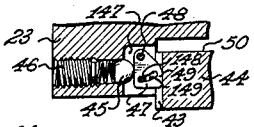
DAVID M. SIMPSON
INVENTOR.

United States Patent Office
2,917,958
Patented Dec. 22, 1959

2,917,958

TOOL HOLDER

David M. Simpson, Redondo Beach, Calif.

Application November 5, 1956, Serial No. 620,552

5 Claims. (Cl. 82—36)

This invention relates generally to tool holders used on lathes, and more particularly has to do with an improved multiple tool holder of the turret type characterized in its design and construction by its capacity for rapid tool mounting on the turret at different adjustable elevations relative to the lathe work, locking or positioning of the turret at universal positions about the turret axis as well as accurate repeat indexing, and other various improvements all having for their purpose the increasing of efficiency and versatility of tool holder operation as well as substantial savings in time involved in setting up and using the holder.

Insofar as I am aware, there is no turret type tool holder permitting universal index positioning of the turret and tools carried thereby about the turret axis, as well as accurate relocation of the tools as during repeat indexing, nor does any conventional tool holder have the capacity for automatic tool elevation adjustment as the turret is revolved, the general practice being to mount different tools separately on a single base, each tool being adjusted for its proper elevation or else to shim the various tools on a turret requiring repeat extended set up times whenever the tools are removed from the holder for sharpening and are then replaced. Furthermore, the turrets of prior holders could not be rotated without dislocating the turret with respect to the base or other portion of the holder to which the turret indexes necessitating resetting the turret on the base after every such dislocation. Other disadvantages of previous holders include the lack of a height adjustment for cutting off tools as well as the fact that other tools could not be mounted conveniently on a turret whenever a cutting off tool was carried thereby, and the capacity of turret locking handles to be inadvertently rotated into a revolving lathe chuck.

Having in mind these substantial disadvantages, it is a major object of the invention to provide a novel multiple tool holder the turret of which is capable of being locked in position at any point about the turret axis of rotation for universal tool positioning, as well as at interrupted detent locations about said axis for accurate turret relocation in repeat indexing. For this purpose, means including a sleeve is provided for mounting the turret to be rotated about the sleeve bringing the tools successively int position facing the lathe work, and a sleeve insert is threaded into the sleeve to rotate into engagement with said means expanding it into engagement with the turret, thereby locking the latter on the sleeve at any selected turret position about the axis of rotation at or between the detent locations, as will be described.

Another major object of the invention comprises the provision of a turret and means mounting the turret for rotation with shoulders thereon successively interengageable as the turret is rotated relative to said means and as the tools are brought into position facing the lathe work, for the purpose of separately and automatically locating the elevation of each tool relative to the work as it is brought into said position, this feature of the invention permitting rapid removal of the tools from the turret for sharpening and quick replacement therein in a minimum length of time since the tools need not be repeat shimmed to proper elevations.

Other aspects of the invention include the provision of a split collar normally held against rotation for seating the turret and upon which the turret may be rotated to various detent positions, the collar and turret being rotatable together without destroying relative indexing therebetween, the provision of a sleeve expanding insert threaded into the sleeve by a handle automatically lockable in various positions about the sleeve axis so that it cannot be inadvertently loosened to rotate into a revolving chuck, a connection between the handle and the insert accommodating relative angular locking therebetween, and a particular slotting arrangement on the turret permitting height adjustment of a cutting off tool.

Other features and objects of the invention, as well as the details of an illustrative embodiment, will be more fully understood from the following detailed description of the drawings, in which:

Fig. 1 is an exploded view of the tool holder elements;

Fig. 2 is a perspective view looking down on the top portion of the tool holder;

Fig. 3 is a vertical section taken through the assembled holder connected to a lathe compound;

Fig. 4 is a section taken on line 4—4 of Fig. 3;

Fig. 5 is a fragmentary plan view of a portion of the split collar shown in Figs. 1 and 3.

Fig. 6 is a vertical section taken through a portion of a modified holder;

Fig. 7 is a section on line 7—7 of Fig. 6; and

Fig. 8 is an enlarged section taken on line 8—8 of Fig. 4.

Fig. 9 is a perspective view showing the sleeve illustrated in Figs. 6 and 7.

In Figs. 1 through 5 the square sided turret 10 contains a bore 11 receiving a sleeve 12 about which the turret is rotatable, the sleeve extending upwardly from the compound rest of an engine lathe or the cross slide of a turret lathe. In the example shown, the flange 13 is held firmly on the compound 14 by screw 15, having a head 16 extending in sleeve counterbore 17 tightened against sleeve shoulder 18 and a threaded shank extending through sleeve bore 19 and through cross member 20 against which the nut 21 is tightened. Member 20 is slidable in a way 22 formed in the compound when the nut is loosened enabling adjustment of the tool holder relative to the compound and parallel to the way, but is held fixed in the way when the nut 21 is itself tightened on the screw shank, thereby retaining the tool holder in fixed position on the compound.

The turret comprising an integral metal body having spaced upper and lower square flanges 23 between which four tools are attached to be held by adjustable screws 24 threaded downwardly through portions of the upper flange overhanging the lower flange, there being four corner screws and two screws intermediate each pair of corner screws, as shown in Fig. 1. A tool 25 is easily connected on the turret by insertion between the upper and lower flanges 23 followed by tightening of the screws 24 downward thereon, no shims under the tool being necessary for height adjustment inasmuch as this feature is otherwise provided for as will be described.

One side of the upper flange 23 is taper slotted in a vertical plane at 26 for the reception of a thin tapered cutting off tool 27 in the slot, the relative vertical position of the tool being controlled not only by the upper screws 24 extending downward into the slot but also by a pair of screws 28 threaded upwardly in the lower flange 23 to engage the lower edge of the cutting off tool in the space between the upper and lower flanges. The cutting off tool 27 is positioned upside down in the slot to minimize chatter associated with its use on small lathes.

Threaded into the sleeve at 29 is an elongated insert 30 the upper portion of which projecting from the sleeve is connected with a handle 31 by a screw 32, the handle being manipulable to rotate the insert relatively up and down in the sleeve. The tightening handle 31 may be loosened for rotation relative to the insert 30 by loosening screw 32. Thereafter the handle may be again tightened to rotate the insert from a more advantageous angular location with respect to the lathe chuck. A locking lug 33 is pivotally mounted at one side of the handle to drop downward under the force of gravity so that the end portion of the lug always extends between a pair of the four screws 34 spaced about the sleeve and threaded downwardly in the turret as shown in Fig. 2. Thus, the handle 31 cannot be inadvertently loosened in a counterclockwise direction without first lifting the lug 33 to clear the heads of the screws 34, thereby preventing unwitting rotation of the handle into a rotating lathe chuck.

The lower end portion of the insert is axially tapered at 35 for reception within a parallel conical taper 36 formed in the sleeve. To reduce the friction developed by engagement of the insert with the sleeve to a minimum, a series of roller bearings 37 are spaced about the insert taper and held in position axially parallel to the two tapers 35 and 36 by a conical retainer 38 which is itself held on the insert by an end washer 39 connected to the insert by the head of screw 40. Upon clockwise rotation of the insert into the sleeve, the roller bearings are brought into engagement with the sleeve taper 36 and thereafter the bearings expand the sleeve in a radial direction as a result of the transmission or thrust from the insert through the roller bearings to the sleeve, the latter being longitudinally slotted at 180° intervals 41 to facilitate expansion thereof. Thus, the turret can be locked in position on the sleeve at any point about the sleeve axis 42 by merely tightening the handle 31.

The invention also makes provision for interrupted locating of the turret about the sleeve axis at twelve detent intervals 43 uniformly spaced about the split collar 44 elastically gripping the sleeve and seating on the flange 13. For this purpose, the turret contains a spring urged ball 45 the spring pressure of which is adjustable by screw 46, the ball pressing against a detent arm 47 loosely pivoted at 48 so that the jutting free end 49 of the arm always presses against the circumference of the collar and successively drops into the detent openings 43 whenever the turret is rotated. These 30° detent intervals provide for accurate relocation of the turret with respect to collar and sleeve in repeat indexing. The arm 47 is itself received in a vertical recess 147 milled into the turret, and a bushing 148 inserted between the recess walls through a slot 149 in the arm 47 prevents collapse of those walls against the arms, all as seen in Fig. 8.

The upwardly facing side of the collar 44 has a raised level portion or plateau 50 facing upwardly toward the inner turret face 51 formed between the turret bore 11 and counterbore 52 within which the collar is received for purposes of repeat indexing as described above. The lower ends of the four screws 34 spaced about the turret inwardly from the four corners thereof project axially downwardly through the inner turret face 51 opposite the collar 44. The ends of three screws 34 are always spaced from the collar by virtue of the gap or vertical spacing between the raised shoulder portion 50 and the remainder of the collar, but the fourth screw end seats against the raised shoulder portion for axially locating the turret and the tool associated with that screw relative to the collar and sleeve. Since the screws 34 are independently mounted, they may be initially adjusted to determine the desired elevation of associated tools with respect to the sleeve, collar and lathe work when the tools are successively brought around to face the work by rotation of the screw ends into engagement with the shoulder 50. Therefore as the turret is rotated for each separate tool cutting operation the tools are automatically brought into proper height adjustment relative to the work, and may be removed from the turret, sharpened and replaced without expending any further set-up time. Sloping cams 152 at opposite ends of the shoulder 50 in the direction of turret rotation accommodate lifting of the screw ends onto the shoulder for locating purposes.

When the handle 31 is loosened, the turret and collar may both be rotated about axis 42 without disturbing the relative angular location therebetween by swinging handle 53 projecting outwardly from the collar, the handle being connected to a hex nut 54 pivotally retained in the collar slot 55, such handle swinging acting to rotate the hex nut to expand the collar for rotation about the sleeve. Collar rotation carried the turret therewith by frictional engagement of the lower end of one screw 34 with shoulder 50.

In the modified holder of Figs. 6, 7 and 9, the sleeve 212 contains a slot 60 receiving a key-shaped plug 61, the outer vertically serrated side of which is normally held inside or flush with the periphery of the sleeve by a spring wire 62 fitted into the sleeve and plug as shown. The plug serrations 63 are intended to be urged into interlocking engagement with similar vertical serrations 64 at the inside of the turret by handle rotation of the insert 65 freely received endwise into the sleeve bore 66, the insert containing a vertically elongated recess 67 receiving the inner side 68 of the plug insert. Clockwise insert rotation brings the cam shaped recess inner wall 69 into engagement with the plug side 68, urging the plug outwardly to accomplish serration interengagement, locking the turret to the sleeve.

In addition, the plug is centrally slotted at 70 in a radial vertical plane, and the pitch distance between the two plug serrations 71 nearest the slot at opposite sides thereof is slightly reduced in relation to the equal pitch distances between all the other serrations. As a result, full depth inter-penetration of the serrations is prevented by the action of a sleeve serration wedging apart the two plug serrations 71, and the plug portions at opposite sides of the slot 70 are therefore tightly urged against the sleeve faces 72 defining slot 60. Thus the turret is frictionally held against endwise upward removal from the sleeve so long as the insert 65 is hand tightened in a clockwise direction.

This form of the invention eliminates the necessity for close machining of the sleeve and turret bore, and the threads 29 shown in Fig. 3. Both the sleeve and turret serrations have rounded or flattened crests to provide for ease of turret rotation when the insert is not tightened in the sleeve.

In Fig. 6 the lower portion of the sleeve 212 and collar are not shown since they are exactly the same as shown in Fig. 3.

I claim:

1. An improved multiple tool holder, comprising mounting means attachable to a lathe compound with the mounting means extending axially vertically relative thereto, a multiple sided turret mounted on said means and having a through bore receiving the mounting means for turret rotation therearound, said turret being adapted to hold a plurality of tools respectively at turret side portions spaced about the bore so that turret rotation about the mounting means brings the tools successively into position facing the lathe work, a plurality of vertically adjustable elements carried by said turret and spaced about the turret opening inwardly of the turret sides, said elements having terminal shoulders spaced below the underside of the turret, said mounting means including a base extending about the mounting means axis in underlying relation to said element terminal shoulders, said base having an upwardly facing vertically raised horizontal surface for seating said shoulders one at a time during turret rotation, said raised surface extending a substantial distance about the turret axis but less than the spacing between successive terminal shoulders, said turret underside having annular extent through which said elements project, said annular underside extent being everywhere spaced above said raised surface when said shoulders are seated thereon, and insert means movable in said mounting means and a handle manipulable to displace said insert means to lock the turret on the mounting means with a selected tool in desired position facing said work, said insert means including a plug movable into tight engagement with the turret bore.

2. The invention as defined in claim 1 in which said elements comprise screws threaded to the turret.

3. The invention as defined in claim 2 in which said base includes a collar forming said raised surface in the direction of turret rotation for successively camming the screw terminal ends up onto the raised surface.

4. The invention as defined in claim 1 including interengageable plug and turret bore serrations.

5. The invention as defined in claim 1 including a spring wire urging the plug away from said turret bore.

References Cited in the file of this patent

UNITED STATES PATENTS

| | | |
|---|---|---|
| Re. 21,833 | Jackson | June 17, 1941 |
| 604,009 | Johnson | May 10, 1898 |
| 854,100 | Meadowcroft | May 21, 1907 |
| 1,527,866 | Hall | Feb. 24, 1925 |
| 1,685,310 | Burrell | Sept. 25, 1928 |
| 2,148,852 | Bergstrom | Feb. 28, 1939 |
| 2,206,373 | Stieber | July 2, 1940 |
| 2,395,893 | Marlow | Mar. 5, 1946 |
| 2,428,508 | Weigle | Oct. 7, 1947 |
| 2,464,156 | Sandersen | Mar. 8, 1949 |
| 2,499,529 | Schlitters | Mar. 7, 1950 |
| 2,547,616 | Beekman | Apr. 3, 1951 |
| 2,571,530 | Brekke | Oct. 16, 1951 |
| 2,710,554 | Borra | June 14, 1955 |
| 2,730,918 | Dagusta | Jan. 17, 1956 |
| 2,807,175 | Tandler et al. | Sept. 24, 1957 |

FOREIGN PATENTS

| | | |
|---|---|---|
| 425,311 | France | Apr. 1, 1911 |
| 510,767 | Germany | Oct. 23, 1930 |